United States Patent [19]
Huetter

[11] Patent Number: 5,973,753
[45] Date of Patent: *Oct. 26, 1999

[54] METHOD AND CIRCUIT ARRANGEMENT FOR SEPARATING LUMINANCE AND CHROMINANCE SIGNALS OF A CVBS SIGNAL

[75] Inventor: Ingo Huetter, Celle, Germany

[73] Assignee: Deutsche Thomson-Brandt GmbH, Villingen-Schwenningen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/797,913

[22] Filed: Feb. 10, 1997

[30] Foreign Application Priority Data

Mar. 9, 1996 [DE] Germany ............ 196 09 193

[51] Int. Cl.$^6$ ................................................ H04N 9/77
[52] U.S. Cl. .................. 348/663; 348/450; 348/607; 348/665; 348/667
[58] Field of Search ................ 348/663, 664, 348/665, 667, 668, 571, 609, 608, 607, 638, 705, 706, 450; H04N 9/77, 9/78, 5/21, 7/01

[56] References Cited

U.S. PATENT DOCUMENTS

| | | | |
|---|---|---|---|
| 3,591,707 | 7/1971 | Abbott | 178/5.4 |
| 3,946,431 | 3/1976 | Gantert | 358/9 |
| 4,389,665 | 6/1983 | Nagao | 358/23 |
| 4,573,068 | 2/1986 | Dorsey | 358/11 |
| 4,893,176 | 1/1990 | Faroudja | 348/610 |
| 4,992,856 | 2/1991 | Robinson | 358/31 |
| 5,006,927 | 4/1991 | Creed | 358/31 |
| 5,424,784 | 6/1995 | Raby | 348/668 |
| 5,686,972 | 11/1997 | Kim | 348/663 |

FOREIGN PATENT DOCUMENTS

| | | |
|---|---|---|
| 0 590831A2 | 6/1994 | European Pat. Off. . |
| 3931903 | 4/1991 | Germany . |
| 2173971 | 10/1986 | United Kingdom . |

OTHER PUBLICATIONS

Masahiko Achiha et al: "Motion–Adaptive Enhanced Decoder and Up–Converter for PAL Signals" Jun. 13, 1991, Broadcast Sessions, Montreux, Jun. 13–18, 1991, vol.—, pp. 197–208, CCITT XP000268889.

(List continued on next page.)

Primary Examiner—John K. Peng
Assistant Examiner—Wesner Sajous
Attorney, Agent, or Firm—Joseph S. Tripoli; Peter M. Emanuel; Paul P. Kiel

[57] ABSTRACT

In analog color television transmission methods, the transmitted CVBS signal comprises luminance and chrominance signals which have to be separated from one another in a television receiver in order to permit separate further processing. Comb filters can be used for this, a picture contents-dependent controller frequently being worked with which switches over between different filter algorithms, that is to say different line combinations, as a function of the respective chrominance signals. In the case of conventional comb signals, the CVBS signal is split into the luminance signal and a chrominance signal which is still to be demodulated into the two color difference signals. In this case, the identification of color edges, in particular, is not always carried out in a manner free from errors. This can lead to only incomplete separation of the luminance and chrominance signals, so that cross effects cannot fully be avoided. Better detection of color edges and hence improved separation of the luminance and chrominance signals can be achieved if the structure of the luminance signal is also investigated for the selection of the filter algorithm. According to the invention, therefore, two color component signals (U*, V*) are demodulated from the CVBS signal, which color component signals are evaluated together with the CVBS signal in order to determine an optimum line combination (CF2) and, corresponding to this combination, permit improved generation of the luminance signal (Y) and of the color difference signals (U, V).

10 Claims, 4 Drawing Sheets

OTHER PUBLICATIONS

IEEE Transactions on Consumer Electronics, BD. 35, NR. 3, 1, Aug 1989, pp. 259–265, XP000065819, Atsushi Ishizu et al. "Digital Signal Processing for Improved NTSC Television Receiver".

Copy of Search Report.

Copy of European Search Report in the German Language citing the above listed documents AA, AM, AR & AS.

Adaptive Luminanz–Hrominanz–Trennung Mit Unterschiedlich Farb–Tragerverkoppelten Samplingphasen, Fernseh–Und Kino–Technik 44.Jg.,Nr. Dec. 1990, S.673–681.

Fig.5
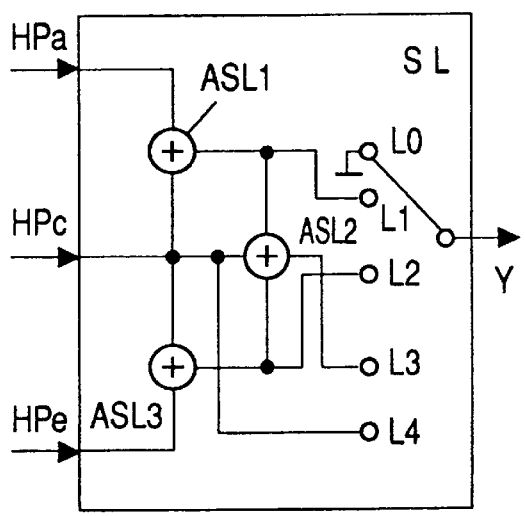
Fig.6a
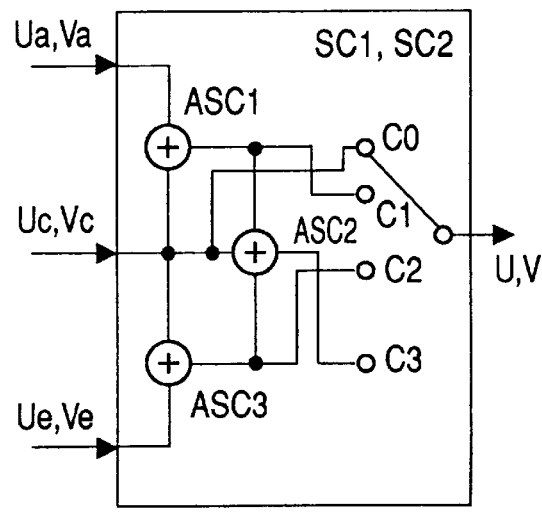
Fig.6b

METHOD AND CIRCUIT ARRANGEMENT FOR SEPARATING LUMINANCE AND CHROMINANCE SIGNALS OF A CVBS SIGNAL

BACKGROUND OF THE INVENTION

1. Field of the Invention

The invention relates to a method and to a circuit arrangement for separating luminance and chrominance signals of a CVBS signal, in particular a comb filter arrangement for PAL signals.

2. Prior Art

In analog colour television transmission methods, the transmitted CVBS signal comprises luminance and chrominance signals. In the case of PAL and NTSC, the chrominance signal, for its part, is composed of two colour difference signals (U/V signals in the case of PAL, I/Q signals in the case of NTSC) which are modulated in quadrature phase onto a colour subcarrier.

In a television receiver, the luminance and chrominance signals must be separated from one another again in order to permit separate further processing. For this, comb filters are used which carry out a combination of a plurality of adjacent lines on the basis of line, field and frame delays for the purpose of signal separation. It is customary here to work with a picture contents-dependent controller which, depending on how the chrominance signals are structured, switches over between different filter algorithms.

In the case of conventional comb filters which split the CVBS signal into the luminance signal and the chrominance signal, which comprises the two colour difference signals still to be demodulated, the identification of colour edges, in particular, is not always carried out in a manner free from errors. This can lead to incomplete separation of the luminance and chrominance signals, so that it is frequently the case that cross effects cannot fully be avoided.

SUMMARY OF THE INVENTION

The invention is based on the object of specifying a method for separating luminance and chrominance signals of a CVBS signal in order to minimize, in particular, the occurrence of cross effects such as, for example, the comb filter errors known as so-called "hanging dots". This object is achieved by means of the method described below and specified in the claims.

The invention is based on the further object of specifying a circuit arrangement for separating luminance and chrominance signals of a CVBS signal. This object is achieved by means of the circuit arrangement descibed below and specified in the claims.

Better detection of colour edges than in the case of known comb filters and hence improved separation of the luminance and chrominance signals can be achieved if the structure of the luminance signal is also investigated for the decision-making of the optimum line combination, that is to say for the selection of the optimum filter algorithm.

In principle, therefore, the inventive method for separating luminance and chrominance signals of a CVBS signal by a combination of a plurality of picture lines, in which one combination is selected from different combinations, consists in the fact that two colour component signals are first demodulated from the CVBS signal, which colour component signals are evaluated together with the CVBS signal in order to determine the combination to be selected, and a luminance signal and colour difference signals are then generated as a result of the selected combination It is advantageous in this case that only the low-frequency component of the CVBS signal is evaluated and the colour component signals still contain the high-frequency component of the luminance signals in addition to the colour difference signals.

It is preferable in this case that both the CVBS signal and the colour component signals are in each case delayed by a whole number of lines and by double this number, and the chrominance signals and the high-frequency luminance signals of the singly delayed line are generated, by weighting corresponding to the optimum combination, from the high-frequency component of the CVBS signal and the colour component signals of three non-delayed, singly delayed and doubly delayed lines.

In this case, after the chrominance and high-frequency luminance signals have been generated, averaging of the chrominance signals over a plurality of lines can be carried out and the low-frequency component of the singly delayed CVBS signal can be added to the high-frequency luminance signal.

It is particularly advantageous in this case if a)
- in a complex plane spanned by the colour component signals, for in each case two picture lines, a first distance value is determined which corresponds to the distance between the colour signals of the two lines, which colour signals are given by the two colour component signals,
- these first distance values are compared with preselected values or first distance values produced for a different line combination or with a fraction of these first distance values, it also being possible to carry out a plurality of comparisons simultaneously,
- and, as a function of the comparison result, either a specific value is allocated to first decision signals or a further comparison is carried out, b)
- for in each case two picture lines, a difference value is determined which corresponds to the magnitude of the difference between the low-frequency components of the CVBS signals of the two lines,
- this difference value is compared with preselected values or difference values produced for a different line combination or with a fraction of these difference values, it also being possible to carry out a plurality of comparisons simultaneously,
- and, as a function of the comparison result, either a specific value is allocated to second decision signals or a further comparison is carried out, c)
- in a complex plane spanned by the colour component signals, a second and third distance value are determined, the second distance value corresponding to the distance of the sum of the colour signals of two lines, which colour signals are given by the two colour component signals, from the origin, and the third distance value corresponding to the distance of one colour signal of a line, which colour signal is given by the two colour component signals, from the origin,
- second distance values are compared with third distance values or with a fraction of these third distance values, and third distance values of one line are compared with third distance values of another line or with a fraction of these third distance values, it also being possible to carry out a plurality of comparisons simultaneously, and, as a function of the comparison results, a binary value is respectively allocated to second decision signals, d) for both colour component signals, first and second summation values are determined, the first summation value corresponding to the magnitude of the sum of one of the two colour component signals of the plurality of lines, and the second summation value corresponding to the sum of the magnitudes of one of the two colour component signals, it being possible to perform different weighting of the colour component signals of the different lines, first summation values are compared with second summation values or with a fraction of these second summation values, and first summation values of the two colour components are compared with a specific value, it also being possible to carry out a plurality of comparisons simultaneously, and, as a function of the comparison results, a binary value is respectively allocated to third decision signals, e) and the decision signals are used to select a combination.

In principle, the circuit arrangement according to the invention consists in the fact that provision is made of a demodulator which demodulates two colour component signals from the CVBS signal, which colour component signals are fed together with the CVBS signal to a comb filter, in which these signals are first evaluated in order to determine the combination to be selected and a luminance signal and colour difference signals are then generated as a result of the selected combination.

It is advantageous in this case that line memories are provided in the comb filter in order to delay both the CVBS signal and the colour component signals. Furthermore, the CVBS and colour component signals of the differently delayed lines are fed to a decision logic unit and to one or more switching and averaging blocks, in which the chrominance signals and the high-frequency luminance signals are generated.

It is preferable that the CVBS signal fed to the comb filter is divided into a high-pass component and a low-pass component by means of a high-pass filter/low-pass filter combination, and only the high-pass component is fed to the switching and averaging block and only the low-pass component is fed to the decision logic unit.

Furthermore, it is preferable that, on the one hand, the generated chrominance signals are fed to median filters, which average the chrominance signals over a plurality of lines, and, on the other hand, it is possible to provide an adder in order to add the low-frequency component of the singly delayed CVBS signal to the generated high-frequency luminance signal.

It is particularly advantageous that the decision logic unit has a first block, to which the differently delayed lines are fed, different distance, difference and summation signals being calculated from the signals that have been fed, these values being compared with preselected values or other calculated values and, as a function of the comparison result, decision signals being determined, and the decision signals are fed to a second block, in which one or more decision values are determined for each combination of the decision signals, which decision values are fed to the switching and averaging block or blocks for driving purposes.

BRIEF DESCRIPTION OF THE DRAWINGS

Exemplary embodiments of the invention are described with reference to the drawings, in which:

FIG. 5 shows different possible arrangements of the lines,

FIG. 6 shows a block diagram of the switching and averaging block for a) the luminance signals, b) the chrominance signals.

DETAILED DESCRIPTION OF THE EXEMPLARY EMBODIMENTS

Figure 1:
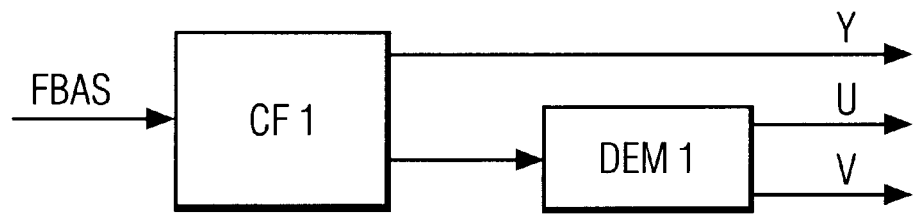
FIG. 1 shows the arrangement of a conventional comb filter and PAL demodulator.

FIG. 1 illustrates the arrangement of a conventional comb filter. The CVBS signal CVBS is first fed to the comb filter CF1. This comb filter then splits the CVBS signal CVBS into a luminance signal Y and a chrominance signal which is still to be demodulated. The chrominance signal is then fed to a demodulator DEM1, in which the colour difference signals U and V are regenerated. The algorithm selection is in this case based merely on an evaluation of the high-frequency signal components.

Figure 2:
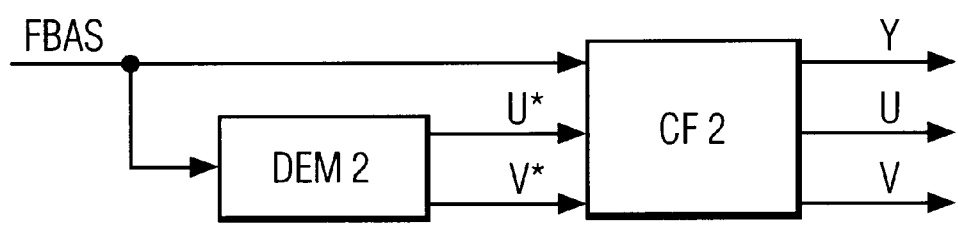
FIG. 2 shows the arrangement of the comb filter according to the invention.

The comb filter according to the invention is arranged, by contrast, in the manner illustrated in FIG. 2. The CVBS signal CVBS is initially fed to a demodulator DEM2. The colour component signals U* and V* generated by this demodulator DEM2 are then fed to the comb filter CF2 along with the CVBS signal CVBS. The comb filter CF2 then removes the subcarrier-based chrominance signal components from the CVBS signal and removes the demodulated, high-frequency luminance signals incorrectly contained in the colour component signals U* and V* from the latter. In contrast to conventional comb filters, therefore, the comb filter CF2 processes demodulated chrominance signals. The separated luminance and colour difference signals Y, U, V are then available at the output of the comb filter.

Figure 3:
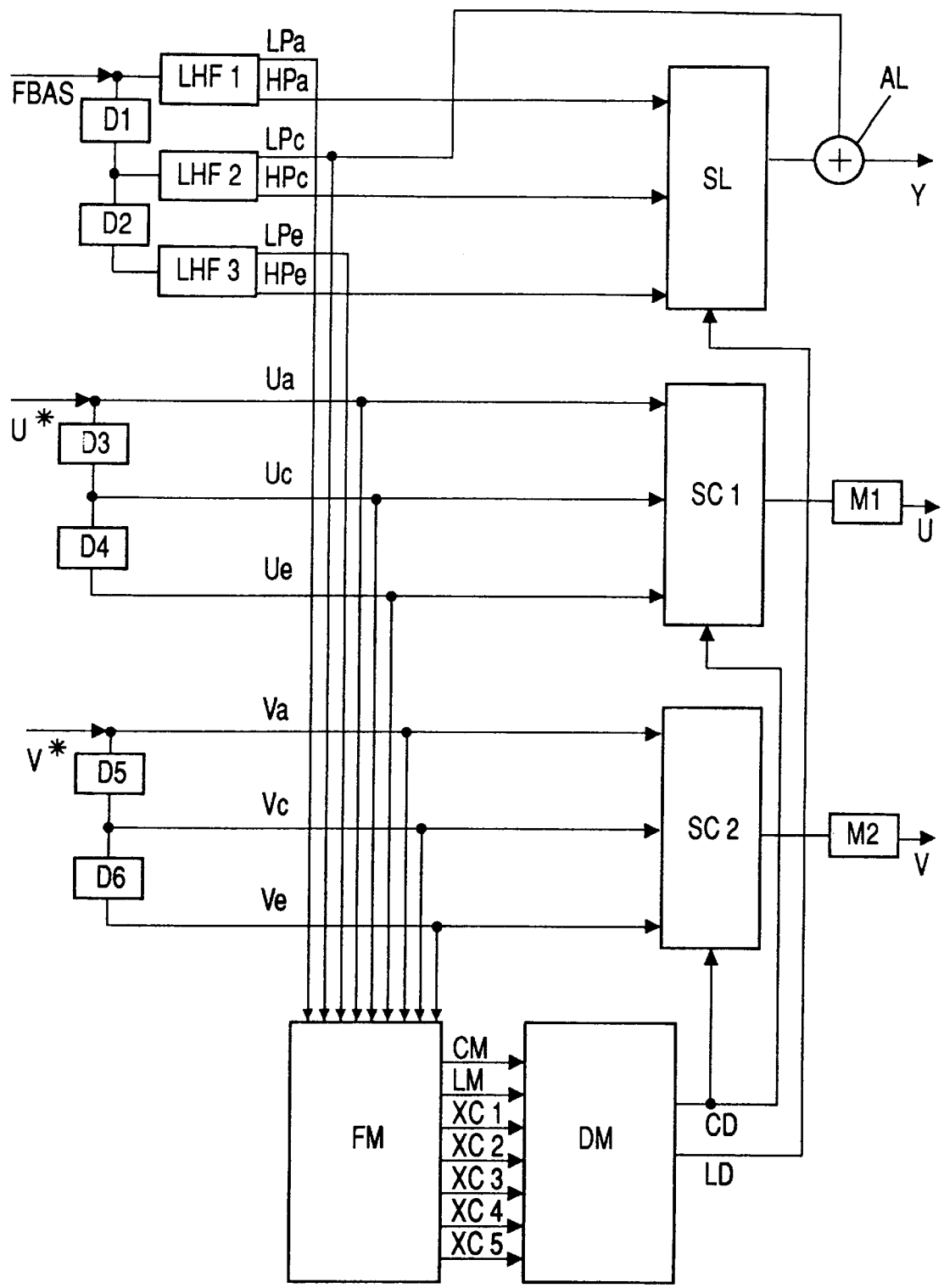
FIG. 3 shows a block diagram of the comb filter according to the invention.

FIG. 3 illustrates a block diagram of the comb filter CF2 according to the invention, a combination of in each case three lines being effected by way of example for the line comb filtering. For this case, both the CVBS signal CVBS and the U* and V* signals are respectively delayed in two delay stages D1, D2 and D3, D4 or D5, D6. Line memories, in particular FIFO memories, are preferably used for this. For PAL signals a delay by two lines is effected in each case, and for NTSC signals a delay by one line is effected in each case. The differently delayed CVBS signals are then initially divided by means of a high-pass filter/low-pass filter combination LHF1, LHF2 or LHF3 into the respective high-pass component HPa, HPc, HPe and low-pass components LPa, LPc, LPe. Both the low-pass signals LPa, LPc, LPe and the demodulated chrominance signals Ua, Uc, Ue and Va, Vc, Ve of the differently delayed lines are then fed to a logic block FM. An analysis of the signal patterns is then carried out in this block. Depending on the structure identified, specific values are then allocated to the decision signals CM, LM, XC1 to XC5 and fed to the block DM. Two respective decision values CD and LD are stored in this block, for example in table form, for the possible combinations of the decision signals. The decision values in this case serve to drive the switching and averaging blocks for the luminance and chrominance signals. Since only the respective high-pass signals of the luminance signals are processed by the switching and averaging block SL, the low-frequency luminance component LPc is subsequently added to the output signal of this block with the aid of an adder AL. In the case of the colour difference signals, there additionally follows, downstream of the blocks SC1 and SC2, respective averaging over a plurality of lines by means of a median filter M1 and M2, which may have line memories for the purpose of delaying the colour difference signals. This averaging eliminates switching artefacts which may be caused, in particular, by noise.

Figure 4:
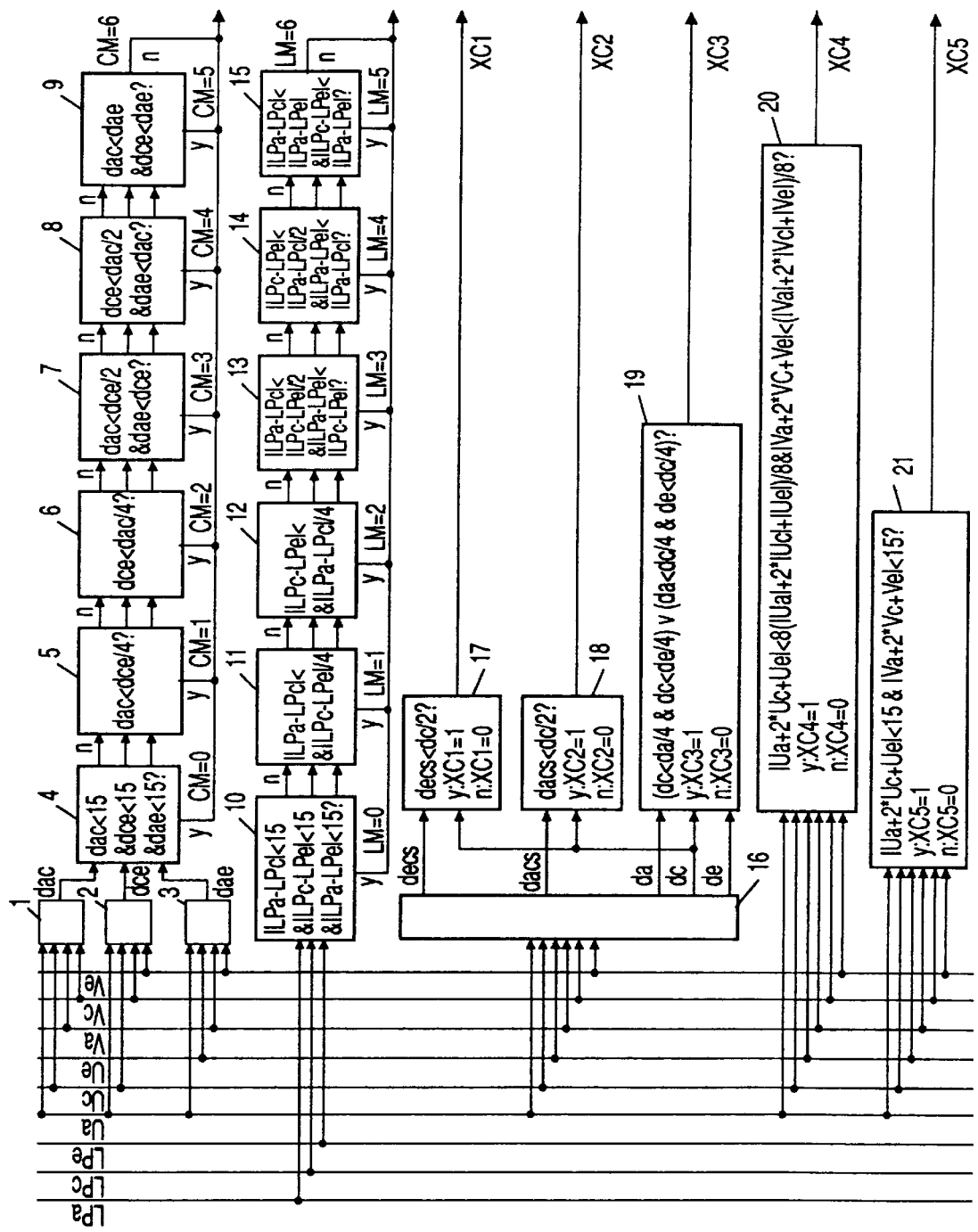
FIG. 4 shows a block diagram of the logic block from FIG. 3.

FIG. 4 illustrates a block diagram of the logic block FM. The differently delayed lines are fed to the decision logic unit, different distance, difference and summation signals being calculated from the signals that have been fed. These values are then compared with preselected values or other calculated values. Different decision signals are then determined as a function of the respective comparison result.

The calculation of the different distance, difference and summation signals is described in more detail below.

In a complex plane spanned by the colour component signals, for in each case two picture lines, a first distance value dac, dce or dae is determined which corresponds to the distance between the colour signals of the two lines, which colour signals are given by the two colour component signals $U^*$, $V^*$. In this way, the distance value dac for the two lines a and c is determined in the block 1 and, for example with the aid of Pythagoras' theorem, turns out to be $dac=\sqrt{[(U_a-U_c)^2+(V_a-V_c)^2]}$. These first distance values are then compared with preselected values or first distance values for a different line combination or with a fraction of these first distance values. In this way, a check is made in block 4 to see whether the distance values dac, dce and dae are all less than a predetermined limit with the value "15". If this is the case, then the value "0" is allocated to the decision signal CM. If, on the other hand, at least one of the distance values exceeds the predetermined limit, then the distance values are fed to the next comparison block 5. Depending on the structure of the chrominance signals, that is to say the result of the comparisons carried out by the blocks 4 to 9, the decision signal CM thus has one of the values between "0" and "6".

Comparisons for difference values produced for the low-pass components of two respective picture lines are carried out correspondingly in the blocks 10 to 15. As a function of the comparison result, a second decision signal LM is then allocated a value between "0" and "6" which reflects the structure in the luminance component of the picture lines investigated.

Furthermore, even further distance values are determined in the block 16 for the identification of cross-colour interference in different special cases. In this way, the distance values decs and dacs specify the distance of the sum of the colour signals of the lines e and c and, respectively, a and c from the origin. These distance values are compared with half the distance of the colour signal of the line c from the origin dc. Furthermore, a check is made to see whether the distance of c from the origin dc is either less than one quarter of the distances da and de or greater than four times the distances da and de. As a function of these comparison results, either the value "0" or "1" is respectively allocated to the decision signals XC1, XC2 and XC3.

Furthermore, the values $|U_a,V_a+2^*U_c,V_c+U_e,V_e|$ and $(|U_a,V_a|+2^*|U_c,V_c|+|U_e,V_e|)/8$ are calculated for the colour component signals and once again compared with one another or with a specific threshold value in order to allocate a respective binary value to the decision signals XC4, XC5.

It should be taken into consideration that although in the block diagram the method is illustrated as if all of the signals were present at the same sampling frequency, luminance and chrominance signals generally have different sampling frequencies (4:1:1). However, matching could be effected, for example, by carrying out a 4:1 up-conversion of the chrominance signals upstream of the comb filter.

The video signal modes corresponding to the decision signals CM and LM are illustrated in FIG. 5. For the mode 0, values of all three lines are within a limit a hence close to one another. If the mode 1 is present, then the line e differs distinctly from the lines a and c, in other words an edge is present. An edge is also correspondingly present in mode 2, since line a differs distinctly from the lines c and e. In mode 3, the line a lies between the lines c and e, and in mode 4 the line e lies between the lines a and c. In mode 5, finally, all the lines lie approximately in a line and, in mode 6, in a zigzag.

The result values CM, LM, XC1–XC5 are evaluated in the block DM. A decision as to how the chrominance signals and high-pass luminance signals are to be processed is made for each combination of the two decision signals CM and LM. The decision values CD and LD, which are specified in Tables 1 and 2, respectively, are determined for this, two decision values, which depend on the current binary value of a further decision signal XC1 to XC5, being possible for some CM/LM combinations.

TABLE 1

CD as a function of the different modes

| CM→ ↓LM | 0 | 1 | 2 | 3 | 4 | 5 | 6 |
|---|---|---|---|---|---|---|---|
| 0 | 3 | 0 | 0 | 2·XC1 | XC2 | 0 | 3-3·XC3 |
| 1 | 3 | 1 | 0 | 0 | XC2 | 0 | XC2 |
| 2 | 3 | 0 | 2 | 2·XC1 | 0 | 0 | 2·XC1 |
| 3 | 0 | 0 | 0 | 0 | 0 | 0 | 0 |
| 4 | 0 | 0 | 0 | 0 | 0 | 0 | 0 |
| 5 | 3 | 0 | 0 | 0 | 0 | 0 | 0 |
| 6 | 3 | 0 | 0 | 0 | 0 | 0 | 0 |

TABLE 2

LD as a function of the different modes

| CM→ ↓LM | 0 | 1 | 2 | 3 | 4 | 5 | 6 |
|---|---|---|---|---|---|---|---|
| 0 | 3 | 0 | 0 | 2·XC1 | XC2 | 0 | 3-3·XC3 |
| 1 | 1 | 1 | 0 | 0 | XC2 | 0 | XC2 |
| 2 | 2 | 0 | 2 | 2·XC1 | 0 | 4·XC4 | 2·XC1 |
| 3 | 0 | 0 | 0 | 0 | 0 | 0 | 0 |
| 4 | 0 | 0 | 0 | 0 | 0 | 0 | 0 |
| 5 | 4·XC5 | 0 | 0 | 0 | 0 | 0 | 4·XC4 |
| 6 | 0 | 0 | 0 | 0 | 0 | 0 | 0 |

The switching and averaging blocks SL and SC1, SC2 are driven by the decision values CD and LD, respectively. Block diagrams of these two blocks are represented in FIGS. 6a) and b). The high-frequency luminance signal components HPa, HPc, HPe of the lines a, c and e are fed in each case to the block SL. Different combinations of the luminance signals are then calulated with the aid of the adders ASL1–ASL3. These combinations are present at the outputs L1–L4, an output value HPe+HPc being produced, for example, for L2. When using the output L0, a 0 signal is produced, that is to say only the low-pass luminance signal LPc is reproduced by the comb filter. Although this then leads to a loss of definition, colour subcarrier vestiges which cannot be reduced by combination with other lines can be completely eliminated in this way.

The block SC1 or SC2 of FIG. 6b also has a very similar structure. In this case, the colour component signals Ua, Va, Uc, Vc, Ue, Ve are applied to the block and, by a combination with the aid of the adders ASC1–ASC 3, corresponding chrominance signals are available at the outputs C0–C3.

The invention can be integrated completely or partially in an integrated circuit, but can equally be realized completely or partially by means of software as well.

The invention can be employed, for example, for PAL and NTSC television systems, but also for further developments of these systems. An application particularly in PALplus receivers is also possible.

I claim:

1. Method for separating luminance and chrominance signals of a CVBS signal (CVBS) by a combination of a plurality of picture lines, in which method one combination is selected from different combinations, comprising the steps of: demodulating two colour component signals (U*, V*) from the CVBS signal (CVBS); evaluating the colour component signals together with the CVBS signal (CVBS) in order to determine a combination of a plurality of picture lines to be selected; and generating a luminance signal (Y) and colour difference signals (U, V) as a result of the selected combination (CF2).

2. Method according to claim 1, wherein the evaluating step comprises evaluating the low-frequency component (LPa, LPc, LPe) of the CVBS signal and the colour component signals (U*, V*) still contain the high-frequency component of the luminance signals in addition to the colour difference signals (U, V).

3. Method according to claim 1, further comprising the steps of delaying the CVBS signal (CVBS) and the colour component signals (U*, V*) in each case a whole number of lines and by double this number, and generating the chrominance signals and the high-frequency luminance signals of the singly delayed line, by weighting corresponding to the optimum combination, from the high-frequency component of the CVBS signal and the colour component signals of three non-delayed, singly delayed and doubly delayed lines.

4. Method according to claim 3, further comprising after the step of generating the chrominance and high-frequency luminance signals, the steps of averaging the chrominance signals over a plurality of lines and adding the low-frequency component of the singly delayed CVBS signal to the high-frequency luminance signal.

5. Method according to claim 1 further comprising the steps of:

a)
   in a complex plane spanned by the colour component signals, for in each case two picture lines, determining a first distance value (dac, dce, dae) which corresponds to the distance between the colour signals of the two lines, which colour signals are given by the two colour component signals (U*, V*),
   comparing these first distance values with preselected values or first distance values produced for a different line combination or with a fraction of these first distance values, it also being possible to carry out a plurality of comparisons simultaneously,
   and, as a function of the comparison result, either allocating a specific value to first decision signals (CM) or carrying out a further comparison, b)
   for in each case two picture lines, determining a difference value which corresponds to the magnitude of the difference between the low-frequency components of the CVBS signals of the two lines,
   comparing this difference value with preselected values or difference values produced for a different line combination or with a fraction of these difference values, it also being possible to carry out a plurality of comparisons simultaneously,
   and, as a function of the comparison result, either allocating a specific value to second decision signals (LM) or carrying out a further comparison, c)
   in a complex plane spanned by the colour component signals, determining a second and third distance value are determined, the second distance value corresponding to the distance of the sum of the colour signals of two lines, which colour signals are given by the two colour component signals (U, V), from the origin (decs, dacs), and the third distance value corresponding to the distance of one colour signal of a line, which colour signal is given by the two colour component signals (U*, V*), from the origin (da, dc, de),
   comparing second distance values with third distance values or with a fraction of these third distance values, and comparing third distance values of one line with third distance values of another line or with a fraction of these third distance values, it also being possible to carry out a plurality of comparisons simultaneously,
   and, as a function of the comparison results, allocating a binary value to second decision signals (XC1, XC2, XC3), d)
   for both colour component signals, determining first and second summation values, the first summation value corresponding to the magnitude of the sum of one of the two colour component signals (U*, V*) of the plurality of lines, and the second summation value corresponding to the sum of the magnitudes of one of the two colour component signals (U*, V*), it being possible to perform different weighting of the colour component signals of the different lines,
   comparing first summation values with second summation values or with a fraction of these second summation values, and comparing first summation values of the two colour components with a specific value, it also being possible to carry out a plurality of comparisons simultaneously,
   and, as a function of the comparison results, allocating a binary value to third decision signals (XC4, XC5), e)
   and using the decision signals (CM, LM, XC1–XC5) to select the combination.

6. Circuit arrangement for separating luminance and chrominance signals of a CVBS signal (CVBS) by a combination of a plurality of picture lines, in which one combination is selected from different combinations, comprising: a demodulator (DEM2) which demodulates two colour component signals (U*, V*) from the CVBS signal; and a comb filter (CF2), which receives the colour component signals and CVBS signal, and in which these signals are first evaluated in order to determine the combination to be selected and a luminance signal (Y) and colour difference signals (U,V) are then generated as a result of the selected combination.

7. Circuit arrangement according to claim 6, wherein the comb filter (CF2) comprises line memories (D1–D6) to delay both the CVBS signal and the colour component signals, and a decision logic unit (FM,DM) and one or more switching and averaging blocks (SL,SC1, SC2), which receive the CVBS and colour component signals of the differently delayed lines, and in which the chrominance signals and the high-frequency luminance signals are generated.

8. Circuit arrangement according to claim 7, further comprising a high-pass filter/low-pass filter combination (LHF1, LHF2, LHF3), which divides the CVBS signal fed to the comb filter into a high-pass component and a low-pass component and only the high-pass component is fed to the switching and averaging block (SL) and only the low-pass component is fed to the decision logic unit (FM,DM).

9. Circuit arrangement according to claim 6, further comprising median filters (M1, M2), which receive the generated chrominance signals and average the chrominance signals over a plurality of lines, and an adder (AL) in which the low-frequency component of the singly delayed CVBS signal is added to the generated high-frequency luminance signal.

10. Circuit arrangement according to one of claims 7, wherein the decision logic unit (FM, DM) has a first block (FM), to which the differently delayed lines are fed, different distance, difference and summation signals being calculated from the signals that have been fed, these values being compared with preselected values or other calculated values and, as a function of the comparison result, decision signals being determined, and the decision signals are fed to a second block (DM), in which one or more decision values (CD, LD) are determined for each combination of the decision signals, which decision values are fed to the switching and averaging block or blocks (SC, SC1, SC2) for driving purposes.

* * * * *